Feb. 14, 1928.

S. MANHEIM 1,659,208

SELF WINDING CLOCK AND THE LIKE

Filed Dec. 19, 1925    2 Sheets-Sheet 1

INVENTOR.
Salomon Manheim.

Feb. 14, 1928.

S. MANHEIM 1,659,208

SELF WINDING CLOCK AND THE LIKE

Filed Dec. 19, 1925    2 Sheets-Sheet 2

INVENTOR.
Salomon Manheim.

Patented Feb. 14, 1928.

1,659,208

UNITED STATES PATENT OFFICE.

SALOMON MANHEIM, OF BRIDGEPORT, CONNECTICUT.

SELF-WINDING CLOCK AND THE LIKE.

Application filed December 19, 1925. Serial No. 76,442.

This invention relates to automatic clock rewinding mechanisms, and is an improvement upon my Patent No. 1,605,674, dated November 2, 1926.

The primary object of the invention is to provide novel means in a mechanism of this character, whereby the rewinding motor is permitted to accelerate or gain speed before assuming the load incident to the rewinding of the main spring of the usual clock mechanism.

Another object of the invention is to provide means for automatically resetting the rewinding mechanism by a predetermined overwinding of the main spring of the clock mechanism.

Another object of the invention is to provide means for resetting the various parts of the energy producing mechanism through the medium of the main spring, so that the clock will be automatically wound and will start of itself whenever it is connected with any suitable source of energy. For example, should the mechanism be used where the source of energy is a storage battery and the battery be removed for repairs or recharging the clock would run under the action of the spring for a given length of time. If the battery is not replaced, the clock would stop when the spring has run down, but with the mechanism in such position that the clock would be immediately rewound and would start automatically when the same is again connected in circuit with the storage battery.

Further advantages and objects of the invention will be apparent throughout the following description and drawings in which Fig. 1 is a sectional side elevation with the mechanism in winding position;

Figure 11:
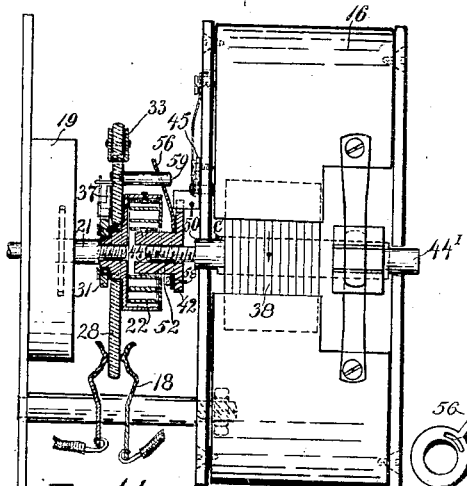
Figure 12:
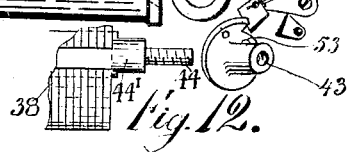

Fig. 11 is a side elevation partly in section of a modified form of my invention in which the gearing is omitted so as to make possible a more compact mechanism, and I have permanently united the winding collet 52 with the winding ratchet 42, so that both form a single unit, and in this manner both parts are threaded onto the spindle end 44 of the motor armature, and Fig. 12 is a perspective view of various elements of the winding drive, in disassembled order.

In proceeding in accordance with the present invention, a back board 13 is employed through which contact posts 14 project. The posts 14 are carried by a plate 26 and are connected to wires 15 which lead from a source of supply. An electric motor 16 is connected to wires 17, the latter being connected to the posts 14. One of the wires 17 is split and connected to spring contact arms 18 that are carried by an insulating block 18' mounted on a front plate 23. A timing mechanism, such as a watch or clock movement is mounted in a casing 19 on the front plate and includes a main driving wheel 20 shown in dotted lines. The wheel 20 is mounted on a driving shaft 21 and is operated by a convolute spring 22 which latter performs a variety of functions as will be later described. The spring 22 is disposed within a barrel 27 attached to the shaft 21, the barrel having a hub 29 on which an insulating disk 28 is mounted so as to turn freely thereon, the hub being reduced at 30 and receiving thereon a ratchet wheel 31 that is attached by screws 32 to the barrel.

Figure 3:
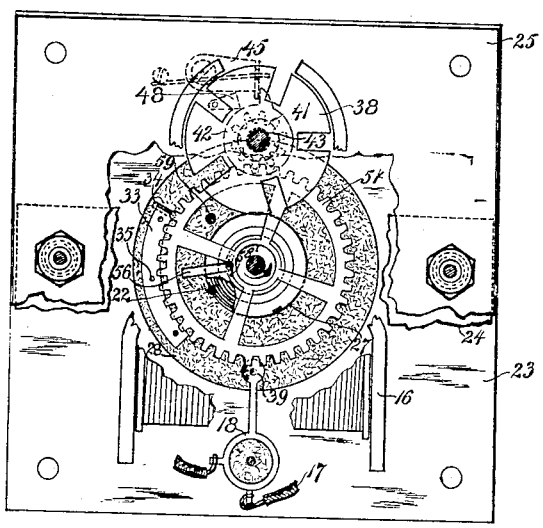
Fig. 3 is a vertical section as seen from the rear of the clock, partly broken away.

The disk 28 has an arcuate arm of a contact 33 on each side thereof, which contact has an intermediate part extended through an opening 34 (Fig. 3) the arms being secured to the disk by fastenings 35 and being engageable with teats 40 on the curved free ends 39 of the spring contact arms 18.

The ratchet wheel 31 has a tooth 36 which is engageable with a pawl 37 carried by the disk 28.

Figures 4, 5:
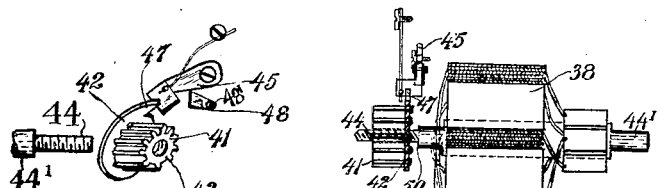
Fig. 4 is a perspective view illustrating various elements of a lock with which the winding mechanism is provided.
Fig. 5 is a side elevation partly in section of the armature and pinion with its affixed ratchet.

A winding pinion 41 having a ratchet 42 affixed thereto is reversibly and threadedly connected to the end 44 of the motor armature spindle 44' as shown in Fig. 5. A pawl 45 tensioned by a spring 46 is engageable with the tooth 47 of the ratchet 42. A plate 25 disposed between the front and back plates 13 and 23 has a stop 48 secured thereto by a fastener 48' and is disposed beneath the pawl 45 and acts to prevent other than the tip of the pawl engaging tooth 47.

Figures 1, 2:
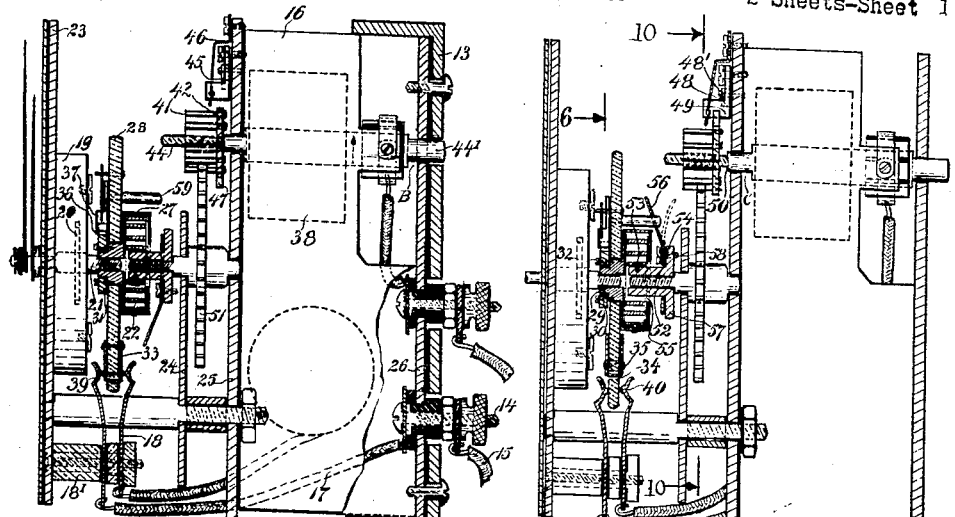
Fig. 2 is a similar view with the rewinding mechanism disconnected from the clock mechanism.

As shown in Figs. 2 and 5, pinion 42 is spaced from a shoulder 50 on the armature spindle 44' which is its position at the completion of the winding operation. Upon engagement of the pinion with the shoulder, the tensioning of the main spring commences.

A winding collet 52 having a hook 53 is secured on the threaded end of spindle 54 of a winding gear 51, the hook extends through wall 52 of the barrel 27 and engages the inner end of the main spring, the other end of which latter is connected to the barrel. An arm 56 is adjustably secured to a flange 57 of the collet by means of a screw 58 passing through a slot 58' in the base of the arm. The arm 56 is in the path of a pin 59, carried by disk 28 so that when the motor is energized, pin 59 is engaged by arm 56 and the disk 28 thereby rotated, thus separating the arms 18 and stopping the motor.

The operation is as follows:—

Assuming that the spring 22 is fully wound, the pinion 42 with its ratchet 47 is positioned on the threaded portion of the armature spindle, as shown in Fig. 2. As the spring unwinds the shaft 21 will be rotated in the direction of the arrow in Fig. 6, carrying with it the ratchet wheel 31, which in turn engages the pawl 37 carried by the insulating disk 28 and thus causes the latter to rotate with the shaft.

As the disk is rotated, contact 33 mounted thereon is moved into engagement with the spring contacts 18 and closes the circuit to the motor, causing the same to rotate in the direction indicated by the dotted arrow.

This movement of the motor causes the pinion 42 to move inwardly upon the screw threaded end 44 of the arbor until the same contacts and binds against the shoulder 50 whereby the pinion will begin to rotate with the motor arbor and in turn will rotate gear 51 and collet 52 to wind the spring.

The various parts are so timed that when the spring is fully wound, the stop 56 carried by the collet 52 will engage the stop 59 carried by the disk 28 and thereby move the contact plate 33 out of engagement with the contacts 18 to open the circuit.

Due to the length of the contact 33, the spring will be overwound to a predetermined extent by the time the same is moved out of engagement with contacts 18.

This predetermined overwinding of the spring permits the rotation of the pinion 42 to be reversed through the medium of the spring 22 and the gear 51, and I have preferred to show and describe a winding operation that is effected in four stages, of which the first stage relates to the acceleration of the armature up to the time when the actual tensioning of the spring commences.

The second stage of the winding operation treats of the tensioning of the spring to the amount needed for operating the timing mechanism.

The third stage treats of the excessive tensioning of the main spring, to provide for the backlash of the spring, and The fourth stage treats of means for releasing the armature from tensioning connection with the spring.

The first stage of the winding operation is as follows.

Figure 6:
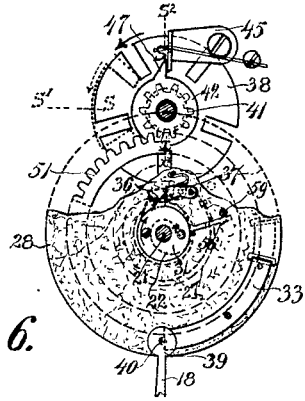
Fig. 6 is a vertical section on line 6—6 of Fig. 2 in the direction of the arrows, showing the position of several of the elements at the beginning of the winding operation.

When, as shown in Fig. 6, the ratchet 31 moves the contact 33 carried by the disk 28 into closed circuit position with the contacts 18, the armature 38 will rotate in the direction indicated by the dotted arrow to move the ratchet 41 inwardly upon the screw threaded spindle 44 until the same engages the shoulder 50, as shown in Fig. 1.

The movable elements are indicated in dotted lines to show their various positions before the circuit is closed.

Figure 9:
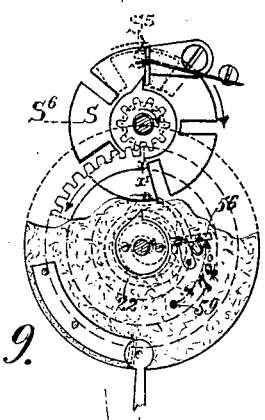
Fig. 9 is a view similar to Fig. 7 showing the position of the elements after the completion of an entire winding operation.

I have also shown by dotted lines the previous position of the armature, that is before the circuit is closed, for instance when the armature is released from the pinion 41 for three-fourths of one thread at the completion of the last winding operation as shown at $S^6$ in Fig. 9, it will have made three-fourths of one revolution at the moment it is firmly connected to the pinion 41, the dotted segment of the armature $S-S^1$, having moved therefrom to the position $S-S^2$ in Fig. 6.

The second stage of the winding operation is as follows.

Figure 7:
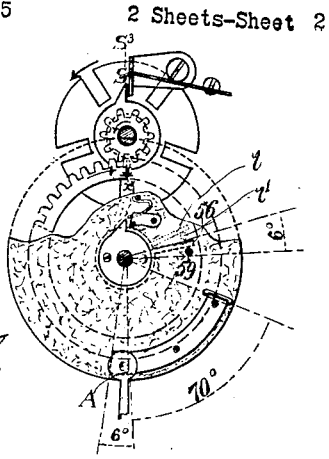
Fig. 7 is a similar view showing the same elements in further progress of rewinding.

The stop 56 carried by the collet 52 being in the same plane of rotation as the disk 28 when rotated for an entire revolution will be at a point of location at the rear of stop 59 of the disk, and the spring is then wound to the exact amount that it unwound itself during the period since the last winding operation. In order that the stop 56 may reach its point of location at the completion of an entire revolution, it will engage stop 59 and move the latter forward before the entire revolution is completed. In Fig. 7, I have shown both stops at the moment they engage and have indicated stop 56 by $r$ and stop 59 by $r'$. When this engagement of the stops takes place, the disk is moved ahead and in order to sustain the winding operation of the motor, the elongated contact 33 and the contacts 18 must have a certain amount of engagement.

When both stops reach the point of location as indicated by $r$ and $r'$ will have to move $r'$ ahead before $r$ can take the position of $r'$, and will continue to move until it takes the position as indicated by 56, having then made a complete revolution and having caused $r'$ to reach the position at 59.

Allowing 3° for the width of each stop, $r$ will have moved for the combined width of these stops which amounts to 6° and therefore the disk 28 with the elongated contact 33 will be moved between the spring contacts 18 for a distance of 6°.

The winding gear 51 having forty teeth and being in the same plane of rotation as the stops 56, will make one full revolution. The pinion 41 having ten teeth, will make four revolutions and the tooth 47 will be at the same location with regard to the pawl tip 49 as shown in Fig. 6, and by the use of a proper combination of gearing, as for example a ratio of four to one, the tooth 47 will always be at the same point of location with regard to the tip of the pawl at the moment when the spring becomes wound to the exact amount needed for the operation of the timing mechanism. The armature having made exactly four revolutions, will be in the position $S—S^3$ which is the same as $S—S^2$ in Fig. 6.

It is to be understood that I do not wish to be limited to this particular combination of gearing, nor to the use of any gearing. In Fig. 11, I have shown a modified form of my invention, in which gearing is omitted.

The third stage of the winding operation is as follows.

The armature being energized, continues to wind the spring until the disk 28 advances for the combined lengths of the engaging surfaces of the contact 33 and the contacts 18.

Figure 8:
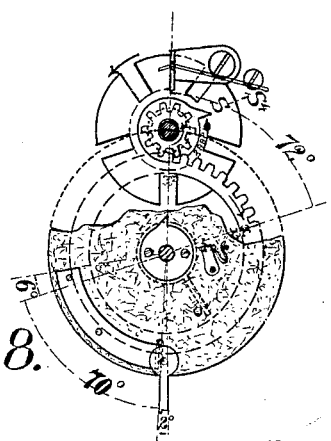
Fig. 8 is a view similar to Fig. 7 showing the mechanism when the spring has been overwound to a predetermined extent.

By providing an elongated contact of predetermined length, the tooth of the ratchet 47 will be moved for a part of a revolution beyond the pawl tip. Of the entire length of this contact, 70° covers the disk for attaining part of this excessive overwinding so that the winding gear which is in the same plane of rotation as the disk, is thereby moved for 70° of its circumference. 2° being allowed for the surface engagement of the contact blades will cause this gear to be moved for a total of 72° or the width of eight of its teeth. The point $x$ on the rim of the winding gear in Fig. 8 will be found 72° past its point of location as disclosed in Fig. 7 and the armature, having rotated 288° in excess, will be at $S—S^4$. The contact 33 is moved 6° of its length between contacts 18 and when it reaches the end of the third part of the winding operation, 70° more of this contact is permitted to pass between contacts 18, making a total of 76° through which the same is moved.

Figure 10:
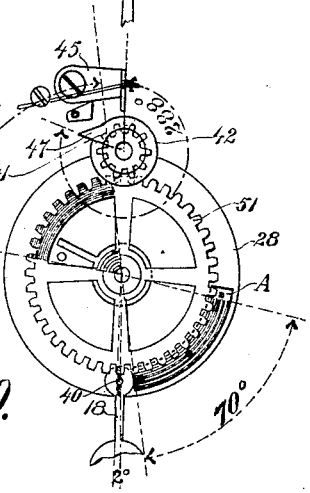
Fig. 10 is a vertical section on the line 4—4 of Fig. 2 in the direction of the arrows.

In Fig. 10, I have illustrated by shaded lines the relative proportions of the contacts 33, 18, the gear 51 and pinion 41 for the purpose of predetermining the exact amount of separation between the ratchet tooth and the pawl at the completion of the third part of the winding operation.

The fourth and last stage of the winding operation is as follows.

When the electric circuit is open and the armature is de-energized, the rotatable winding elements, including stop 56, are reversed through the backlash of the tensioned main spring, and when the tooth 47 of the ratchet becomes intercepted by the pawl, as shown in Fig. 9, all of these elements except the armature will be brought to a stop.

The armature being forcibly and speedily reversed through the excess energy of the tensioned main spring, will attain the physical properties of a flywheel and will be caused to release itself from the pinion 41 and ratchet 45, and the armature having weight and momentum, will continue to rotate until the excess energy is spent thereby moving the pinion 41 out of engagement with the shoulder 50, taking the position $S—S^5$ shown at Fig. 9.

As shown in Figs. 1, 2 and 11, I have provided end spaces B and C between the frame plate bearings of the motor and the shoulder 50 of the armature spindle, to permit the armature to shift sideways in case the winding pinion and its ratchet meet with too much frictional resistance from the winding gear, thereby permitting the armature to follow the course of the least frictional resistance.

From the foregoing description of operation, it will be seen that the armature will be allowed to accelerate before undertaking the load of rewinding the timing mechanism and is particularly adapted for conditions where a diminished energy supply in the line causes the motor to be in a weaker working condition than when a normal supply of energy is available.

Although I have shown and described means that operate at predetermined times to effect the desired results, nevertheless, under certain conditions, as set forth in my patent above noted, I do not wish to be limited to the provision of such means, as more or less overwinding of the spring may occur at times, under favorable conditions, without such means, as, for example, would be the case, when an abundant supply of energy to the motor is available as already described, but as the supply often varies, whether batteries or mechanical means are used for generating this energy, the overwinding of the spring without the provision of this means becomes uncertain.

Having thus described my invention, what I claim is:—

1. In combination, a timing mechanism having a spring motor for operating the same, electrically controlled means for storing a predetermined amount of energy in the spring motor, rotatable means controlled by the timing mechanism and movable independently thereof and having an insulated contact adapted to close the circuit through said electrically controlled means, a clutch interposed between the spring motor and the energy storing means adapted for engagement upon the preliminary acceleration of the energy storing means, means to open the circuit upon the storing of a predetermined amount of energy in the spring motor, and means to disconnect the clutch by the reaction of the spring motor upon the storage of excess energy therein.

2. In combination, a timing mechanism, electrically controlled means for storing a predetermined amount of energy in said timing mechanism, circuit controlling means operable by the timing mechanism, a clutch interposed between the electrically controlled storing means and the timing mechanism, mechanically operated means to render the clutch operative upon the depletion of the energy in the timing mechanism below a predetermined amount, and means to render the clutch inoperative by the retrograde movement of the timing mechanism upon the storing of energy in said mechanism above a predetermined amount.

3. In combination, a timing mechanism, an energy storing mechanism for said timing mechanism, means to connect the energy storing mechanism with the timing mechanism when the energy in the timing mechanism has reached a predetermined low point of depletion, and means to disconnect the energy storing mechanism by the retrograde movement of the timing mechanism when the energy stored therein reaches a point above a predetermined amount.

4. In combination, a timing mechanism, electrically controlled means for storing energy in the timing mechanism, rotatable switch means for controlling the storing mechanism and operable by the timing mechanism, rotatable clutch means for connecting the energy storing means to the timing mechanism upon the preliminary acceleration of the storing means, and means to disconnect the clutch by the retrograde movement of the timing mechanism upon the storing of energy in timing mechanism in excess of a predetermined amount.

5. In combination, a timing mechanism, an electrically controlled energy storing mechanism, means operable by the timing mechanism to close the circuit to the storing mechanism, a clutch interposed between the timing mechanism and storing mechanism adapted for connection by the initial acceleration of the storing mechanism, means controlled by the storing mechanism for opening the circuit when the energy stored in the timing mechanism has reached a predetermined point, and means to disconnect the clutch by the retrograde movement of the timing mechanism when the energy stored therein has reached a point in excess of the predetermined amount.

6. In combination, a timing mechanism having a spring motor for operating the same, an electrically controlled energy storing mechanism for the timing mechanism having a rotating armature, circuit controlling means operable by the spring motor to close the circuit to the storing mechanism, a clutch carried by the rotating armature and engageable upon the initial acceleration thereof, means actuated by the storing mechanism to open the circuit when the energy stored has reached a predetermined point and means to disconnect the clutch from the rotating armature by the reversal of the spring motor when the energy stored has reached a point in excess of a predetermined amount.

7. In combination, a timing mechanism, means for storing a predetermined amount of energy in the timing mechanism, a clutch interposed between the timing mechanism and the energy storing mechanism adapted for engagement upon the preliminary acceleration of the energy storing mechanism, and means to disconnect the clutch by the retrograde movement of the timing mechanism upon the storage of excess energy in the timing mechanism.

8. In combination, a timing mechanism, means for storing a predetermined amount of energy in the timing mechanism, means to operate the energy storing mechanism when the energy in the timing mechanism has reached a predetermined low point of depletion, connecting means between the timing mechanism and the energy storing mechanism adapted for operation during the preliminary acceleration of the energy storing mechanism, and means to release the connecting means by the retrograde movement of the timing mechanism upon the storage of excess energy in said mechanism.

9. In combination, a timing mechanism, energy storing mechanism for said timing mechanism, means to operate the energy storing mechanism when the energy in the timing mechanism has reached a predetermined low point of depletion, clutch means interposed between the timing mechanism and the energy storing mechanism adapted for operation upon the preliminary acceleration of the energy storing mechanism, means to retard the operation of the energy storing mechanism when the energy stored in the timing mechanism reaches a predetermined point, and means to disconnect the clutch by the retrograde movement of the timing mechanism upon the storage of excess energy in said mechanism.

In testimony whereof I hereunto affix my signature.

SALOMON MANHEIM.